(12) United States Patent
McLellan et al.

(10) Patent No.: US 9,744,446 B2
(45) Date of Patent: Aug. 29, 2017

(54) MYSTERY BOXES THAT ADJUST DUE TO PAST SPENDING BEHAVIOR

(71) Applicant: KABAM, INC., San Francisco, CA (US)

(72) Inventors: Sam McLellan, San Francisco, CA (US); Luc Pieron, San Francisco, CA (US); Dylan Swift, San Francisco, CA (US); Stephanie Schultz, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 645 days.

(21) Appl. No.: 14/282,788

(22) Filed: May 20, 2014

(65) Prior Publication Data

US 2015/0335995 A1    Nov. 26, 2015

(51) Int. Cl.

| | |
|---|---|
| A63F 13/12 | (2006.01) |
| A63F 13/69 | (2014.01) |
| A63F 13/67 | (2014.01) |
| A63F 13/61 | (2014.01) |
| G06Q 30/02 | (2012.01) |
| G06Q 50/00 | (2012.01) |
| A63F 13/30 | (2014.01) |

(52) U.S. Cl.
CPC ............. *A63F 13/12* (2013.01); *A63F 13/61* (2014.09); *A63F 13/67* (2014.09); *A63F 13/69* (2014.09); *G06Q 30/02* (2013.01); *G06Q 50/00* (2013.01)

(58) Field of Classification Search
None
See application file for complete search history.

(56) References Cited

U.S. PATENT DOCUMENTS

| | | | |
|---|---|---|---|
| 5,816,918 A | 10/1998 | Kelly et al. | 463/16 |
| 5,933,813 A | 8/1999 | Teicher | |
| 5,964,660 A | 10/1999 | James | |
| 6,142,472 A | 11/2000 | Kliebisch | |
| 6,190,225 B1 | 2/2001 | Coleman | |
| 6,190,255 B1 | 2/2001 | Thomas et al. | 463/20 |
| 6,306,033 B1 | 10/2001 | Niwa et al. | 463/1 |
| 6,347,996 B1 | 2/2002 | Gilmore et al. | 463/17 |
| 6,402,619 B1 | 6/2002 | Sato | |

(Continued)

FOREIGN PATENT DOCUMENTS

| | | |
|---|---|---|
| KR | 1020130137431 | 12/2013 |
| WO | WO 02/26333 | 4/2002 |

(Continued)

OTHER PUBLICATIONS

"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

(Continued)

*Primary Examiner* — Milap Shah
*Assistant Examiner* — Robert T Clarke, Jr.
(74) *Attorney, Agent, or Firm* — Sheppard Mulin Richter & Hampton LLP (57) ABSTRACT

A system and method for varying the distribution probabilities of individual potential awards associated with probability item bundles depending on a purchase history of a user activating a probability item bundle.

18 Claims, 5 Drawing Sheets

(56) References Cited

U.S. PATENT DOCUMENTS

| | | | |
|---|---|---|---|
| 6,561,904 B2 | 5/2003 | Locke et al. ............... 463/25 |
| 6,604,008 B2 | 8/2003 | Chudley | |
| 6,607,437 B2 | 8/2003 | Casey et al. ............... 463/16 |
| 6,745,236 B1 | 6/2004 | Hawkins | |
| 6,811,483 B1 | 11/2004 | Webb | |
| 6,811,484 B2 | 11/2004 | Katz et al. ............... 463/17 |
| 6,850,900 B1 | 2/2005 | Hare | |
| 6,928,474 B2 | 8/2005 | Venkatesan | |
| 7,050,868 B1 | 5/2006 | Graepel ............... 700/93 |
| 7,076,453 B2 | 7/2006 | Jammes | |
| 7,136,617 B2 | 11/2006 | Libby ............... 434/350 |
| 7,156,733 B2 | 1/2007 | Chiang et al. ............... 463/1 |
| 7,192,352 B2 | 3/2007 | Walker et al. ............... 463/42 |
| 7,326,115 B2 | 2/2008 | Baerlocher ............... 463/25 |
| 7,381,133 B2 | 6/2008 | Thomas ............... 463/20 |
| 7,455,586 B2 | 11/2008 | Nguyen et al. ............... 463/16 |
| 7,533,336 B2 | 5/2009 | Jaffe | |
| 7,660,740 B2 | 2/2010 | Boone | |
| 7,682,239 B2 | 3/2010 | Friedman et al. ............... 463/16 |
| 7,749,056 B2 | 7/2010 | Ando et al. ............... 463/6 |
| 7,785,188 B2 | 8/2010 | Cannon ............... 463/20 |
| 7,813,821 B1 | 10/2010 | Howell ............... 700/91 |
| 7,819,749 B1 | 10/2010 | Fish et al. ............... 463/42 |
| 7,945,802 B2 | 5/2011 | Hamilton, II et al. ............... 713/500 |
| 7,959,507 B2 | 6/2011 | Cannon ............... 463/21 |
| 8,010,404 B1 | 8/2011 | Wu et al. ............... 705/10 |
| 8,016,668 B2 | 9/2011 | Hardy | |
| 8,047,909 B2 | 11/2011 | Walker et al. ............... 463/16 |
| 8,057,294 B2 | 11/2011 | Pacey et al. ............... 463/20 |
| 8,066,571 B2 | 11/2011 | Koster et al. ............... 463/42 |
| 8,147,340 B2 | 4/2012 | Brunet de Courssou et al. ............... 463/42 |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf et al. ............... 463/20 |
| 8,231,470 B2 | 7/2012 | Feeney et al. ............... 463/42 |
| 8,239,487 B1 | 8/2012 | Hoffman et al. ............... 709/218 |
| 8,246,439 B2 | 8/2012 | Kelly et al. ............... 463/20 |
| 8,272,934 B2 | 9/2012 | Olive et al. ............... 463/16 |
| 8,272,951 B2 | 9/2012 | Ganz ............... 463/29 |
| 8,272,956 B2 | 9/2012 | Kelly | |
| 8,282,491 B2 | 10/2012 | Auterio | |
| 8,287,367 B2 | 10/2012 | Hall et al. ............... 463/29 |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker et al. ............... 463/25 |
| 8,317,584 B2 | 11/2012 | Aoki et al. ............... 463/13 |
| 8,317,601 B1 | 11/2012 | Luciano, Jr. ............... 463/25 |
| 8,323,110 B2 | 12/2012 | Shibamiya et al. ............... 463/42 |
| 8,328,642 B2 | 12/2012 | Mosites et al. ............... 463/42 |
| 8,332,260 B1 | 12/2012 | Mysen | |
| 8,332,544 B1 | 12/2012 | Ralls ............... 710/8 |
| 8,348,716 B2 | 1/2013 | Ganz et al. ............... 446/175 |
| 8,348,762 B2 | 1/2013 | Willis | |
| 8,348,767 B2 | 1/2013 | Mahajan | |
| 8,348,768 B2 | 1/2013 | Auterio et al. ............... 463/42 |
| 8,360,858 B2 | 1/2013 | LaRocca | |
| 8,360,867 B2 | 1/2013 | VanLuchene | |
| 8,360,868 B2 | 1/2013 | Shvili ............... 463/27 |
| 8,366,544 B2 | 2/2013 | Walker | |
| 8,366,550 B2 | 2/2013 | Herrmann et al. ............... 463/42 |
| 8,371,925 B2 | 2/2013 | Bonney et al. ............... 463/20 |
| 8,376,826 B2 | 2/2013 | Katz et al. ............... 463/16 |
| 8,382,572 B2 | 2/2013 | Hoffman ............... 463/20 |
| 8,388,427 B2 | 3/2013 | Yariv ............... 463/9 |
| 8,401,913 B2 | 3/2013 | Alivandi | |
| 8,408,989 B2 | 4/2013 | Bennett et al. ............... 463/20 |
| 8,409,015 B2 | 4/2013 | Van Luchene ............... 463/42 |
| 8,439,759 B1 | 5/2013 | Mello et al. ............... 463/42 |
| 8,475,262 B2 | 7/2013 | Wolf et al. ............... 463/20 |
| 8,506,394 B2 | 8/2013 | Kelly et al. ............... 463/29 |
| 8,512,150 B2 | 8/2013 | Hermann et al. ............... 463/43 |
| 8,583,266 B2 | 11/2013 | Herbrich et al. ............... 700/93 |
| 8,636,591 B1 | 1/2014 | Hawk | |
| 8,696,428 B1 | 4/2014 | Post | |
| 8,715,068 B2 | 5/2014 | Arnone | |
| 8,777,754 B1 | 7/2014 | Santini et al. ............... 463/42 |
| 8,784,214 B2 | 7/2014 | Parks et al. ............... 463/42 |
| 8,790,185 B1 | 7/2014 | Caldarone et al. ............... 463/42 |
| 8,821,260 B1 | 9/2014 | DeSanti et al. ............... 463/25 |
| 8,831,758 B1 | 9/2014 | Chu et al. ............... 700/91 |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,138,639 B1 | 9/2015 | Ernst | |
| 9,257,007 B2 | 2/2016 | Santini | |
| 2002/0059397 A1 | 5/2002 | Feola | |
| 2002/0072412 A1 | 6/2002 | Young et al. ............... 463/42 |
| 2002/0094863 A1 | 7/2002 | Klayh ............... 463/21 |
| 2002/0095327 A1 | 7/2002 | Zumel | |
| 2002/0115488 A1 | 8/2002 | Berry et al. ............... 463/42 |
| 2002/0119824 A1 | 8/2002 | Allen ............... 463/42 |
| 2002/0151351 A1 | 10/2002 | Baerlocher | |
| 2002/0165794 A1 | 11/2002 | Ishihara | |
| 2002/0183105 A1 | 12/2002 | Cannon et al. ............... 463/16 |
| 2002/0193162 A1 | 12/2002 | Walker et al. ............... 463/42 |
| 2003/0008713 A1 | 1/2003 | Ushiro et al. ............... 463/42 |
| 2003/0027619 A1 | 2/2003 | Nicastro, Sr. ............... 463/16 |
| 2003/0032476 A1 | 2/2003 | Walker | |
| 2003/0102625 A1 | 6/2003 | Katz et al. ............... 273/138.1 |
| 2003/0109301 A1 | 6/2003 | Chudley et al. ............... 463/23 |
| 2003/0157978 A1 | 8/2003 | Englman | |
| 2003/0174178 A1 | 9/2003 | Hodges | |
| 2003/0190960 A1 | 10/2003 | Jokipii et al. ............... 463/42 |
| 2003/0216167 A1 | 11/2003 | Gauselmann | |
| 2004/0002387 A1 | 1/2004 | Grady | |
| 2004/0068451 A1 | 4/2004 | Lenk | |
| 2004/0215524 A1 | 10/2004 | Parkyn | |
| 2004/0224745 A1 | 11/2004 | Bregenzer | |
| 2004/0225387 A1 | 11/2004 | Smith, III ............... 700/92 |
| 2004/0267611 A1 | 12/2004 | Hoerenz | |
| 2005/0096117 A1 | 5/2005 | Katz et al. ............... 463/17 |
| 2005/0114223 A1 | 5/2005 | Schneider | |
| 2005/0165686 A1 | 7/2005 | Zack | |
| 2005/0192087 A1 | 9/2005 | Friedman et al. ............... 463/25 |
| 2005/0209008 A1 | 9/2005 | Shimizu et al. ............... 463/43 |
| 2005/0227751 A1 | 10/2005 | Zanelli et al. ............... 463/1 |
| 2005/0255914 A1 | 11/2005 | McHale | |
| 2005/0277474 A1 | 12/2005 | Barry ............... 463/42 |
| 2006/0030407 A1 | 2/2006 | Thayer | |
| 2006/0063587 A1 | 3/2006 | Manzo ............... 463/25 |
| 2006/0116196 A1 | 6/2006 | Vancura ............... 463/20 |
| 2006/0155597 A1 | 7/2006 | Gleason | |
| 2006/0200370 A1 | 9/2006 | Ratliff | |
| 2006/0217198 A1 | 9/2006 | Johnson ............... 463/40 |
| 2006/0287029 A1 | 12/2006 | Yoshinobu et al. ............... 463/9 |
| 2006/0287102 A1 | 12/2006 | White et al. ............... 463/42 |
| 2007/0021213 A1 | 1/2007 | Foe et al. ............... 463/42 |
| 2007/0077988 A1 | 4/2007 | Friedman | |
| 2007/0111770 A1 | 5/2007 | Van Luchene ............... 463/7 |
| 2007/0129139 A1 | 6/2007 | Nguyen et al. ............... 463/25 |
| 2007/0129147 A1 | 6/2007 | Gagner ............... 463/42 |
| 2007/0191101 A1 | 8/2007 | Coliz et al. ............... 463/42 |
| 2007/0191102 A1 | 8/2007 | Coliz et al. ............... 463/42 |
| 2007/0213116 A1 | 9/2007 | Crawford et al. ............... 463/16 |
| 2007/0281285 A1 | 12/2007 | Jayaweera | |
| 2008/0009344 A1 | 1/2008 | Graham | |
| 2008/0032787 A1 | 2/2008 | Low | |
| 2008/0058092 A1 | 3/2008 | Schwartz et al. ............... 463/25 |
| 2008/0113706 A1 | 5/2008 | O'Halloran ............... 463/16 |
| 2008/0113815 A1 | 5/2008 | Weingardt | |
| 2008/0124353 A1 | 5/2008 | Brodeur | |
| 2008/0154798 A1 | 6/2008 | Valz | |
| 2008/0171599 A1 | 7/2008 | Salo et al. ............... 463/41 |
| 2008/0176625 A1 | 7/2008 | Kelly | |
| 2008/0194318 A1 | 8/2008 | Kralicky | |
| 2008/0200260 A1 | 8/2008 | Deng ............... 463/42 |
| 2008/0207306 A1 | 8/2008 | Higbie ............... 463/23 |
| 2008/0214295 A1 | 9/2008 | Dabrowski | |
| 2008/0227525 A1 | 9/2008 | Kelly et al. ............... 463/20 |
| 2008/0234043 A1 | 9/2008 | McCaskey | |

(56) References Cited

U.S. PATENT DOCUMENTS

| | | | |
|---|---|---|---|
| 2008/0248867 A1 | 10/2008 | Englman | |
| 2008/0275786 A1 | 11/2008 | Gluck | |
| 2008/0300045 A1 | 12/2008 | Ratcliff | 463/25 |
| 2008/0318668 A1 | 12/2008 | Ching | |
| 2009/0011812 A1 | 1/2009 | Katz | |
| 2009/0017886 A1 | 1/2009 | McGucken | |
| 2009/0036199 A1 | 2/2009 | Myus | |
| 2009/0048918 A1 | 2/2009 | Dawson | |
| 2009/0061982 A1 | 3/2009 | Brito | |
| 2009/0124353 A1 | 5/2009 | Collette et al. | 463/25 |
| 2009/0204907 A1 | 8/2009 | Finn | |
| 2009/0210301 A1 | 8/2009 | Porter | |
| 2009/0234710 A1 | 9/2009 | Belgaied Hassine | |
| 2009/0315893 A1 | 12/2009 | Smith et al. | 345/473 |
| 2010/0004048 A1 | 1/2010 | Brito | |
| 2010/0022307 A1 | 1/2010 | Steuer et al. | 463/42 |
| 2010/0035689 A1 | 2/2010 | Altshuler | |
| 2010/0041472 A1 | 2/2010 | Gagner | |
| 2010/0041481 A1 | 2/2010 | Smedley | |
| 2010/0050088 A1 | 2/2010 | Neustaedter | |
| 2010/0070056 A1 | 3/2010 | Coronel | 700/91 |
| 2010/0094841 A1 | 4/2010 | Bardwil | |
| 2010/0099471 A1 | 4/2010 | Feeney et al. | 463/1 |
| 2010/0107214 A1 | 4/2010 | Ganz | 726/1 |
| 2010/0113162 A1 | 5/2010 | Vemuri et al. | 463/42 |
| 2010/0174593 A1 | 7/2010 | Cao | |
| 2010/0198653 A1 | 8/2010 | Bromenshenkel | |
| 2010/0210356 A1 | 8/2010 | Losica | 463/26 |
| 2010/0227675 A1 | 9/2010 | Luxton et al. | 463/25 |
| 2010/0227682 A1 | 9/2010 | Reville et al. | 463/29 |
| 2010/0228606 A1 | 9/2010 | Walker | |
| 2010/0240444 A1 | 9/2010 | Friedman et al. | 463/25 |
| 2010/0241491 A1 | 9/2010 | Eglen | |
| 2010/0241492 A1 | 9/2010 | Eglen et al. | 705/10 |
| 2010/0306015 A1 | 12/2010 | Kingston | 705/8 |
| 2011/0065511 A1 | 3/2011 | Mahan | 463/40 |
| 2011/0092271 A1 | 4/2011 | Nguyen | |
| 2011/0092273 A1 | 4/2011 | Cerbini | |
| 2011/0111841 A1 | 5/2011 | Tessmer | 463/25 |
| 2011/0112662 A1 | 5/2011 | Thompson | 700/91 |
| 2011/0113353 A1 | 5/2011 | Koh | |
| 2011/0118002 A1 | 5/2011 | Aoki | |
| 2011/0145040 A1 | 6/2011 | Zahn | |
| 2011/0151957 A1 | 6/2011 | Falciglia, Sr. | 463/18 |
| 2011/0218033 A1 | 9/2011 | Englman et al. | 463/25 |
| 2011/0227919 A1 | 9/2011 | Bongio et al. | 345/426 |
| 2011/0256936 A1 | 10/2011 | Walker et al. | 463/42 |
| 2011/0263324 A1 | 10/2011 | Ganetakos et al. | 463/31 |
| 2011/0275438 A9 | 11/2011 | Hardy et al. | 463/42 |
| 2011/0281638 A1 | 11/2011 | Bansi | |
| 2011/0281654 A1 | 11/2011 | Kelly et al. | 463/42 |
| 2011/0282764 A1 | 11/2011 | Borst | |
| 2011/0300923 A1 | 12/2011 | Van Luchene | |
| 2011/0319152 A1 | 12/2011 | Ross et al. | 463/20 |
| 2011/0319170 A1 | 12/2011 | Shimura et al. | 463/42 |
| 2012/0011002 A1 | 1/2012 | Crowe | |
| 2012/0015714 A1 | 1/2012 | Ocko et al. | 463/25 |
| 2012/0015715 A1 | 1/2012 | Luxton et al. | 463/25 |
| 2012/0034961 A1 | 2/2012 | Berman et al. | 463/6 |
| 2012/0034973 A1 | 2/2012 | Frank | |
| 2012/0040743 A1 | 2/2012 | Auterio | |
| 2012/0040761 A1 | 2/2012 | Auterio | |
| 2012/0042282 A1 | 2/2012 | Wong | |
| 2012/0047002 A1 | 2/2012 | Patel | |
| 2012/0059730 A1 | 3/2012 | Jensen | |
| 2012/0083909 A1 | 4/2012 | Carpenter et al. | 700/92 |
| 2012/0094743 A1 | 4/2012 | Odom | |
| 2012/0101886 A1 | 4/2012 | Subramanian | |
| 2012/0108306 A1 | 5/2012 | Munsell | |
| 2012/0109785 A1 | 5/2012 | Karlsson | |
| 2012/0115593 A1 | 5/2012 | Vann | |
| 2012/0122589 A1 | 5/2012 | Kelly | |
| 2012/0129590 A1 | 5/2012 | Morrisroe | |
| 2012/0130856 A1 | 5/2012 | Petri | |
| 2012/0142429 A1 | 6/2012 | Muller | |
| 2012/0156668 A1 | 6/2012 | Zelin | 434/362 |
| 2012/0157187 A1 | 6/2012 | Moshal | 463/25 |
| 2012/0157193 A1 | 6/2012 | Arezina et al. | 463/25 |
| 2012/0166380 A1 | 6/2012 | Sridharan | |
| 2012/0166449 A1 | 6/2012 | Pitaliya | 707/748 |
| 2012/0178514 A1 | 7/2012 | Schulzke | 463/17 |
| 2012/0178515 A1 | 7/2012 | Adams et al. | 463/17 |
| 2012/0178529 A1 | 7/2012 | Collard | |
| 2012/0197874 A1 | 8/2012 | Zatkin | |
| 2012/0202570 A1 | 8/2012 | Schwartz et al. | 463/10 |
| 2012/0203669 A1 | 8/2012 | Borsch | |
| 2012/0215667 A1 | 8/2012 | Ganz | |
| 2012/0221430 A1 | 8/2012 | Naghmouchi | |
| 2012/0226573 A1 | 9/2012 | Zakas et al. | 705/26.2 |
| 2012/0231891 A1 | 9/2012 | Watkins | |
| 2012/0244945 A1 | 9/2012 | Kolo et al. | 463/42 |
| 2012/0244947 A1 | 9/2012 | Ehrlich | 463/42 |
| 2012/0244950 A1 | 9/2012 | Braun | 463/42 |
| 2012/0245988 A1 | 9/2012 | Pace | |
| 2012/0256377 A1 | 10/2012 | Schneider et al. | 273/292 |
| 2012/0282986 A1 | 11/2012 | Castro | 463/1 |
| 2012/0289315 A1 | 11/2012 | Van Luchene | |
| 2012/0289330 A1 | 11/2012 | Leydon et al. | 463/31 |
| 2012/0289346 A1 | 11/2012 | Van Luchene | |
| 2012/0295699 A1 | 11/2012 | Reiche | |
| 2012/0296716 A1 | 11/2012 | Barbeau | |
| 2012/0302329 A1 | 11/2012 | Katz et al. | 463/25 |
| 2012/0309504 A1 | 12/2012 | Isozaki | |
| 2012/0311504 A1 | 12/2012 | Van Os et al. | 715/853 |
| 2012/0322545 A1 | 12/2012 | Arnone et al. | 463/25 |
| 2012/0322561 A1 | 12/2012 | Kohlhoff | 463/42 |
| 2012/0330785 A1 | 12/2012 | Hamick et al. | 705/26.41 |
| 2013/0005437 A1 | 1/2013 | Bethke | |
| 2013/0005466 A1 | 1/2013 | Mahajan | |
| 2013/0005473 A1* | 1/2013 | Bethke | A63F 13/822 463/42 |
| 2013/0005475 A1 | 1/2013 | Mahajan | |
| 2013/0005480 A1 | 1/2013 | Bethke | |
| 2013/0006735 A1 | 1/2013 | Koenigsberg et al. | 705/14.12 |
| 2013/0006736 A1 | 1/2013 | Bethke | |
| 2013/0012304 A1 | 1/2013 | Cartwright | |
| 2013/0013094 A1 | 1/2013 | Parks et al. | 700/92 |
| 2013/0013326 A1 | 1/2013 | Miller et al. | 705/1.1 |
| 2013/0013459 A1 | 1/2013 | Kerr | |
| 2013/0029745 A1 | 1/2013 | Kelly et al. | 463/19 |
| 2013/0072278 A1 | 3/2013 | Salazar et al. | 463/16 |
| 2013/0079087 A1 | 3/2013 | Brosnan et al. | 463/16 |
| 2013/0090173 A1 | 4/2013 | Kislyi | |
| 2013/0090750 A1 | 4/2013 | Herrman et al. | 700/92 |
| 2013/0095914 A1 | 4/2013 | Allen et al. | 463/25 |
| 2013/0123005 A1 | 5/2013 | Allen et al. | 463/29 |
| 2013/0124361 A1 | 5/2013 | Bryson | |
| 2013/0151342 A1 | 6/2013 | Citron et al. | 705/14.64 |
| 2013/0173393 A1 | 7/2013 | Calman et al. | 705/14.66 |
| 2013/0178259 A1 | 7/2013 | Strause et al. | 463/6 |
| 2013/0210511 A1 | 8/2013 | LaRocca et al. | 463/12 |
| 2013/0217489 A1 | 8/2013 | Bendayan | |
| 2013/0226733 A1 | 8/2013 | Evans | |
| 2013/0237299 A1 | 9/2013 | Bancel et al. | 463/9 |
| 2013/0244767 A1 | 9/2013 | Barclay | |
| 2013/0288757 A1 | 10/2013 | Guthridge | |
| 2013/0290147 A1 | 10/2013 | Chandra et al. | 705/27.1 |
| 2013/0303276 A1 | 11/2013 | Weston et al. | 463/29 |
| 2013/0310164 A1 | 11/2013 | Walker et al. | 463/26 |
| 2013/0344932 A1 | 12/2013 | Adams et al. | 463/17 |
| 2014/0004884 A1 | 1/2014 | Chang | |
| 2014/0018156 A1 | 1/2014 | Rizzotti et al. | 463/25 |
| 2014/0033262 A1 | 1/2014 | Anders | |
| 2014/0038679 A1 | 2/2014 | Snow | 463/11 |
| 2014/0067526 A1 | 3/2014 | Raju | |
| 2014/0067544 A1 | 3/2014 | Klish | |
| 2014/0073436 A1 | 3/2014 | Takagi | |
| 2014/0087864 A1 | 3/2014 | Togashi | 463/29 |
| 2014/0089048 A1 | 3/2014 | Bruich | |
| 2014/0100020 A1 | 4/2014 | Carroll | |
| 2014/0106858 A1 | 4/2014 | Constable | |
| 2014/0128137 A1 | 5/2014 | Balise, III | 463/10 |
| 2014/0157314 A1 | 6/2014 | Roberts | |
| 2014/0206452 A1 | 7/2014 | Bambino | |

(56) References Cited

U.S. PATENT DOCUMENTS

| | | | |
|---|---|---|---|
| 2014/0243072 A1 | 8/2014 | Santini | |
| 2014/0274359 A1 | 9/2014 | Helava | |
| 2014/0295958 A1 | 10/2014 | Shono | |
| 2014/0315616 A1 | 10/2014 | Avin | |
| 2014/0329585 A1 | 11/2014 | Santini | |
| 2014/0337259 A1 | 11/2014 | Lamb | |
| 2015/0011286 A1 | 1/2015 | Kim | |
| 2015/0019349 A1 | 1/2015 | Milley | |
| 2015/0031440 A1 | 1/2015 | DeSanti et al. | 463/25 |
| 2015/0087378 A1 | 3/2015 | Louie | |
| 2015/0306494 A1 | 10/2015 | Pieron | |
| 2015/0352436 A1 | 12/2015 | Pieron | |

FOREIGN PATENT DOCUMENTS

| | | |
|---|---|---|
| WO | WO 2013/013281 | 1/2013 |
| WO | WO 2013/059639 | 4/2013 |
| WO | WO 2013/116904 | 6/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

New Feature: Tiered Tournaments and Tournament Updates, printed from http://community.kabam.com/forums/showthread.php?171349-New-Feat on Feb. 11, 2014, 2 pages.

Wikipedia, Mafia Wars, <http://en.wikipedia.org/wiki/Mafia_Wars>, Jan. 28, 2012, 3 pages.

"Quest item—WoWWiki—Your guide to the World of Warcraft", printed from http://www.wowwiki.com/Quest Item, Apr. 16, 2014, 1 page.

"Cataclysm Guide: Guild Advancement—Wowhead", http://www.wowhead.com/guide=cataclysm&guilds, printed Dec. 5, 2013, 4 pages.

TFF Challenge—UC Davis, http://tffchallenge.com/team/uc-davis/, printed Jan. 15, 2014, 12 pages.

"Guild Housing System—FlyFF Wiki", http://flyff-wiki.gpotato.com/wiki/Guild_Housing_System, printed Dec. 5, 2013, 5 pages.

Gem System—Street Fighter X Tekken, http://www.streetfighter.com/us/sfxtk/features/gem-system, printed Nov. 6, 2012, 6 pages.

Profession—WoWWiki—Your guide to the World of Warcraft, http://www.wowwiki.com/Profession, printed Nov. 6, 2012, 8 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Diablo 2, Blizzard Entertainment, Mar. 23, 2009, manual and online website, http://web.archive.org/web/20090323171356/http://classic.battle.net/diablo 2exp/items/basics.shtml, 51 pages.

Path of Exile, Internet posting: http://web.archive.org/web/20120606004658/http://www.pathofexile.com/forum/view-thread/12056, Nov. 16, 2011, 52 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory—Guides—Equipment Upgrading 101: Enhancements, URL: maplestory.nexon.net/guides/game-play/systems/OOFlk [Retrieved Jun. 24, 2013], 3 pages.

MapleStory—Guides—Equipment Upgrading 101: Potentials, URL: maplestory.nexon.net/guides/game-play/systems/OOFlj/ [Retrieved Jun. 24, 2013], 5 pages.

Dreamslayer's Enchanting and Upgrading Guide—With Pictures:D and Explanations, URL: forums.elswordonline.com/Topic5673.aspx [Retrieved Feb. 21, 2013], 10 pages.

The Arreat Summit—Items: Basic Item Information, URL: web.archive.org/web/20090323171356/http://classic.battle.net/diablo2exp/items/basics.shtml [Retrieved Feb. 21, 2013], 3 pages.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do >, Apr. 23, 2014, 9 pages.

"Behavioural Analytics & Campaigning", http://lotaris.com/behavioural._analytics_and._Campaigning.htm, screenshot access date May 24, 2012 2:21 PM, 1 page.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

TFWiki "teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

(56) References Cited

OTHER PUBLICATIONS

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php ?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

Elsword—Wikipedia, the free encyclopedia, URL: en.wikipedia.org/wiki/Elsword [Retrieved Feb. 21, 2013], 6 pages.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, 1 page.

Super Mario Bros. 3, StrategyWiki, the video game walkthrough and strategy guide, http://strategywiki.org/wiki/Super_Mario_Bros._3, 4 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

* cited by examiner

MYSTERY BOXES THAT ADJUST DUE TO PAST SPENDING BEHAVIOR

FIELD OF THE DISCLOSURE

This disclosure relates to mystery item boxes, also known as probability item bundles, in virtual worlds. The distribution probabilities of the individual potential awards associated with probability item bundles vary depending on the purchase history of the user activating a probability item bundle.

BACKGROUND

Probability item bundles in a game space are known; however, conventional systems do not modify the distribution probabilities of the individual potential awards associated with probability item bundles based on the purchase history of the user activating a probability item bundle.

SUMMARY

One aspect of the disclosure relates to a system configured to provide a game space, in accordance with one or more implementations. Users of game spaces may redeem probability item bundles associated with individual sets of potential awards. One or more of the individual potential awards of a probability item bundle may be based on a distribution probability. A distribution probability may be based on a purchase history of a user. One or more actual awards associated with a probability item bundle may be stochastically chosen based on one or more distribution probabilities associated with the individual potential awards. The actual awards may be chosen when the probability item bundle is activated.

In some implementations the system may include one or more servers. The server(s) may be configured to communicate with one or more client computing platforms according to a client/server architecture. The users may access the system and/or the game spaces via the client computing platforms, in for instance, one or more games.

The server may be configured to execute one or more computer program components. The computer program components may include one or more of a game component, a user component, a probability component, a shop component, an activation component, a purchase history component, and/or other components.

The game component may be configured to execute an instance of a game space. The game component may be configured to implement the instance of the game space to facilitate participation by users in a game within the game space by determining view information from the instance and transmitting the view information to the client computing platforms associated with the users. The view information may facilitate the presentation of views of the game space to the users by the client computing platforms.

A user component may be configured to track the activity of game space users. The user module may generate a profile for each user of the game space. The user profiles may include, for example, information identifying users (e.g., a username or handle, a number, an identifier, and/or other identifying information) within the game space, security login information (e.g., a login code or password), game space account information, subscription information, virtual currency account, user inventory, and/or other information.

A probability component may be configured to determine and/or track one or more distribution probabilities for one or more individual potential awards where a choice of one or more individual potential awards is determined by a stochastic selection of awards according to one or more distribution probabilities. A distribution probability may depend on a spending metric of a user.

The shop component may be configured to offer one or more virtual items for sale, including, probability item bundles, in exchange for real currency, virtual currency, and/or other forms of consideration.

An activation component may be configured to stochastically choose none, one or more actual awards from a selection of one or more individual potential awards, wherein one or more of the individual potential awards may be associated with one or more distribution probabilities.

The purchase history component may be configured to monitor and/or track purchase histories of one or more users of a game space. One or more purchase histories may be quantified into a spending metric.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
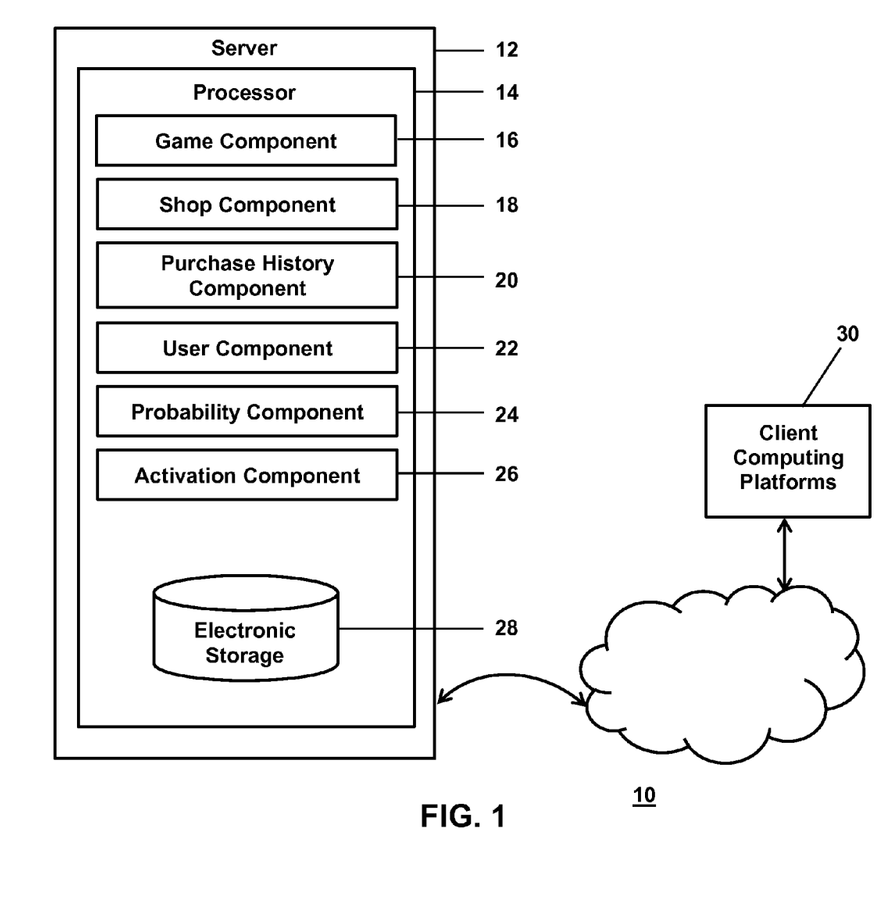
FIG. 1 illustrates a system configured to provide a game space, in accordance with one or more implementations.

FIG. 1 illustrates a system 10 configured to provide a game space to users. Providing the game space may include hosting the game space over a network. In some implementations system 10 may include a server 12. Server 12 may be configured to communicate with one or more client computing platforms 30 according to a client/server architecture. Users may access system 10 and/or the game space via client computing platforms 30.

It should be appreciated that although components 16, 18, 20, 22, 24, and 26 are illustrated in FIG. 1 as being implemented within a single processing unit, in implementations in which processor 14 includes multiple processing units, one or more of components 16, 18, 20, 22, 24, and 26 may be implemented remotely from the other components. In implementations in which processor 14 includes multiple processing units, one or more of components 16, 18, 20, 22, 24, and 26 may be implemented remotely from the other components in various combinations. The description of the functionality provided by the different components 16, 18, 20, 22, 24, and 26 described below is for illustrative purposes, and is not intended to be limiting, as any of components 16, 18, 20, 22, 24, and 26 may provide more or less functionality than is described. For example, one or more of components 16, 18, 20, 22, 24, and 26 may be eliminated, and some or all of its functionality may be provided by other ones of components 16, 18, 20, 22, 24, and 26. As another example, processor 14 may be configured to execute one or more additional components that may perform some or all of the functionality attributed below to one of components 16, 18, 20, 22, 24, and 26.

The server 12 may be configured to execute one or more computer program components. The computer program components may include one or more of a game component 16, shop component 18, purchase history component 20, user component 22, probability component 24, activation component 26, and/or other components.

Game component 16 may be configured to implement an instance of the game space executed by the computer components. In some cases, the instance of the game space may reflect the state of the game space. The instance of the game space may be used to push state information to clients (e.g., client computing platforms 30) for implementation on the client, may be used to verify state information generated on client executing expressions of the instance locally, and/or for other purposes. State information may include information about the state of the game space such as, without limitation, position information of one or more objects, topography information, object status/shape information, battle information, score information, user or character progress information, user inventory information, user or character resource information, progress information for one or more activities or actions, view information describing a view of the game space, and/or other information that describes the state of the game space. Expressions of the instance executed on the client facilitate presentation of views on the client of the game space. Expressions of the instance executed on the client may be configured to simply present views of the game space based on the state information (e.g., via streaming view information, object/position information, and/or other state information) received from game component 16. Expressions of the instance executed on the client may include space logic that effectively provides for execution of a limited version of the instance on a client that is synchronized and/or verified with state information received from game component 16. The view presented on a given client may correspond to a location in the game space (e.g., the location from which the view is taken, the location the view depicts, and/or other locations), a zoom ratio, a dimensionality of objects, a point-of-view, and/or view parameters. One or more of the view parameters may be selectable by the user.

The instance of the game space may comprise a simulated space that is accessible by users via clients that present the views of the game space to a user. The simulated game space may have a topography, express ongoing real-time interaction by one or more users, and/or include one or more objects positioned within the topography that are capable of locomotion within the topography. In some instances, the topography may be a 2-dimensional topography. In some instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the game space may comprise one or more user achievements. In a game space such as an online game, a user achievement may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, defeating an enemy or enemies, rescuing an ally or allies, completing a mission or quest, and/or other actions. For example, in a game space involving building virtual structures, a user achievement may be associated with building, upgrading, and/or repairing a building or buildings. In an example involving a game space with an aspect related to the development of a character, a user achievement may be associated with using melee attack or a spell; interacting with another player and/or a non-player character; defeating an enemy or enemies; and/or rescuing an ally or allies. In an example involving a game space with an aspect related to the development of an army, a user achievement may be associated with winning a battle, developing an army to a certain size, and/or sustaining a minimal number of losses during a battle.

Within the instance of the game space executed by game component 16, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user. The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

Users may participate in an instance of a game space by controlling one or more of the available user controlled elements in the game space. Control may be exercised through control inputs and/or commands input by the users through client computing platforms 30. In some implementations user controlled elements may include units, structures, and/or other controllable elements. In some implementations such as simulated battle, a user's goal may be to defeat an opposing force's units, structures, and/or other elements. In some implementations units, structures, or units and structures may have combat attributes representative of a unit or structure's effectiveness in categories of attributes related to combat.

In some implementations a game space user may use and/or interact with virtual items within a virtual game space. In some implementations a virtual item may have attributes and/or characteristics that distinguish that virtual item from other similar virtual items. For example, in some instances, a user may equip an avatar with a virtual sword. An exceptional quality virtual sword may have a damage rating of 100, and a common quality virtual sword may have a damage rating of 50. In some instances, a user may equip an avatar with virtual armor. Common quality virtual armor may have a protection rating of 50, and poor quality virtual armor may have a protection rating of 10. In some implementations when a user equips and/or uses a virtual item, the user may benefit from the particular attributes of that virtual item.

In some instances users may engage in fictional battle against enemies. In some instances the amount of damage a user is able to deal and withstand may be dependent on the quality of their equipped weapon and armor. In some instances, a user equipped with an exceptional quality virtual sword may be able to affect greater damage on an enemy with each attack than if the same user was equipped with a common quality virtual sword. In some instances a user equipped with common quality virtual armor may be able to withstand greater damage from an enemy than if the same user was equipped with poor quality virtual armor.

In some instances of simulated combat damages may include an elemental attribute such as fire damage, cold damage, and/or other elemental types of damage. In some implementations weapons the particular attributes of a type of virtual item may include elemental characteristics. In some implementations a sword of fire may affect fire damage to an enemy with every attack. In some implementations an armor of ice may include increased resistance to ice elemental damage.

In some implementations of simulated combat a user's character or avatar may be associated with attributes that affect their combat characteristics such as strength, agility, health and/or other attributes. In some implementations virtual items may modify a character's combat characteristics. In some implementations boots of quickness may increase character's agility when equipped. In some implementations armor of health may increase a character's health when equipped. Other embodiments are envisioned.

Virtual items may be a type of item that may be useful to a user's character in a virtual game space, such as: helms, necklaces, amulets, earrings, spaulders, chestpieces, shirts, jackets, capes, gloves, belts, pants, dresses, leggings, socks, boots, rings, swords, guns, shields, grenades, batons, bows and arrows, quivers, medicines, tonics, foodstuffs, health packs, curios, gadgets, baubles, pets, vehicles, building materials, supplies, building plans, resources, and/or other virtual items.

In some implementations game space users may be able to purchase virtual items in exchange for consideration. In some implementations users may be able to purchase one or more virtual items grouped in a probability item bundle. In some implementations the exact contents of a probability item bundle may be unknown to a user at the time of purchase. These probability item bundles may be associated with a set of one or more individual potential awards that could be actually awarded in the probability item bundle upon activation of the probability item bundle. In some implementations the individual potential awards of the probability item bundle may be known to the user. In some implementations the actual award of the probability item bundle are not revealed to the user until after the user purchases the probability item bundle. The one or more individual potential awards in the probability item bundle may be associated with one or more distribution probabilities that affect the likelihood that the one or more individual potential awards will be actually awarded in the probability item bundle at the time of activation.

Users may interact with each other through communications exchanged within the game space. Such communications may include one or more of textual chat, instant messages, private messages, voice communications, and/or other communications. Communications may be received and entered by the users via their respective client computing platforms 30. Communications may be routed to and from the appropriate users through server 12 (e.g., through game component 16).

The above description of the views of the game space determined from the instance executed by game component 16 is not intended to be limiting. The game space may be presented in a more limited, or more rich, manner. For example, views of the game space may be selected from a limited set of graphics depicting an event in a given place within the game space. The views may include additional content (e.g., text, audio, pre-stored video content, and/or other content) that describes particulars of the current state of the place, beyond the limited set of graphics. For example, a view may include a generic battle graphic with a textual description of the opponents to be confronted. Other representations of individual places within the game space are contemplated.

Shop component 18 may be configured to manage the purchase of virtual items and/or virtual probability item bundles in exchange for consideration. Consideration may include virtual currency, real currency, skill points, experience points, and/or other forms of consideration. In some implementations shop component 18 may be configured to present a shop interface to one or more game space users. A shop interface may include an offer to sell a virtual probability item bundle containing one or more individual potential awards.

In some implementations a shop component may be configured to offer one or more probability item bundles for purchase to a game space user. In some implementations the consideration requested in exchange for a probability item bundle may be customized to the user to whom the offer is being made. In some instances the consideration requested may depend on a characteristic and/or attribute of a user, including but not limited to, a spending metric associated with the user.

In some implementations the purchase of a probability item bundle may be accomplished when a user clicks on a graphical representation of a probability item bundle. In some instances clicking on a graphical representation of a probability item bundle may constitute the acceptance of an offer to sell the probability item bundle for a specified consideration. In some implementations clicking on a graphic of a probability item bundle will cause an amount of consideration associated with the probability item bundle to be deducted from an account associated with the user that clicked on the probability item bundle.

Purchase history component 20 may be configured to track and/or quantify game space users' purchase histories. In some implementations purchase history component 20 may track and quantify purchase histories for one or more users of a game space. In some implementations a user's purchase history may be quantified into a spending metric.

In some implementations a spending metric may reflect one or more spending characteristics of a user. In some implementations spending characteristics may be: total consideration exchanged for virtual goods, average consideration exchanged for virtual goods, consideration spent for virtual goods during a period of time, total virtual currency exchanged for virtual goods, average virtual currency exchanged for virtual goods, virtual currency spent for virtual goods during a period of time, total real currency exchanged for virtual goods, average real currency exchanged for virtual goods, real currency spent for virtual goods during a period of time, and/or other spending characteristics.

In some implementations a user's spending metric may be a value related to the user's purchase history. In some implementations a user's spending metric may be a value related to a user's purchase history as compared to other game space users. In some implementations a user with a purchase history reflecting the greatest amount of spending in, for example, one of the characteristics listed above, may have a spending metric of 1. In some implementations a user with a purchase history reflecting the second greatest amount of spending in, for example, one of the characteristics listed above, may have a spending metric of 2.

The user component 22 may be configured to access and/or manage one or more user profiles and/or user information associated with users of the system 10. The one or more user profiles and/or user information may include information stored by server 12, one or more of the client computing platforms 30, and/or other storage locations. The user profiles may include, for example, information identifying users (e.g., a username or handle, a number, an identifier, and/or other identifying information) within the game space, security login information (e.g., a login code or password), game space account information, subscription information, virtual currency account information (e.g., related to currency held in credit for a user), relationship information (e.g., information related to relationships between users in the game space), game space usage information, demographic information associated with users, interaction history among users in the game space, information stated by users, purchase information of users, browsing history of users, a client computing platform identification associated with a user, a phone number associated with a user, user inventory information, and/or other information related to users.

In some implementations a user component may manage and/or track virtual currency account information associated with a user of a game space. Virtual currency account information for a user of a game space may include: virtual currency balance, real currency balance, resource balance, and/or other metrics associated with a virtual currency account of a game space user.

In some implementations a user component may manage and/or track the virtual item inventory associated with a user of a game space. Virtual item inventory information may include: the type of items in a user inventory, the number of items in a user inventory, the quality of items in a user inventory, and/or other characteristics of items in a user inventory.

The probability component 24 may be configured to determine and/or track one or more distribution probabilities for one or more individual potential awards where one or more actual awards is determined by a stochastic selection of individual potential awards according to one or more distribution probabilities. In some implementations the probability component may associate one or more distribution probabilities with individual potential awards. In some implementations a probability item bundle will be associated with one or more individual potential awards.

In some implementations the distribution probabilities for one or more individual potential awards in a probability item bundle may be adjusted. In some instances the distribution probability may vary depending on the factors such as: the time, characteristics of the user purchasing a probability item bundle, the amount of consideration paid for the purchase, the purchase history of the user purchasing the probability item bundle, characteristics of the user activating the probability item bundle, the purchase history of the user activating the probability item bundle, and/or other factors. In some implementations the purchase history of a buyer of a probability item bundle may be expressed as a spending metric determined by purchase history component 20.

In some implementations a probability item bundle may be based on a purchase history of a user other than the user purchasing the probability item bundle. In some cases a probability item may be purchased as a gift for another player. In some cases distribution probabilities associated with individual potential awards for a probability item bundle may be based on a purchase history of a recipient of a probability item bundle. In some implementations the purchase history of a user activating a probability item bundle may be expressed as a spending metric determined by purchase history component 20.

In some implementations a distribution probability may be a function of one or more variables, including, the spending metric of the user. In some implementations the function may be a mathematical derivation of one or more variables, including the spending metric. In some implementations the function may not be a strictly mathematical derivation, and may instead be an algorithmic expression of one or more variables, including the spending metric.

In some implementations the distribution probability may be increased so that the probability of stochastically choosing an individual potential award associated with the distribution probability is increased when a user's spending metric indicates a purchase history below a threshold. In some instances the threshold may indicate the average amount of purchases made by the users of a game space. In some instances the average amount of purchases may be calculated based on the average number of transactions, the average amount of transactions, and/or other methods of calculation.

In some implementations a spending metric may be expressed as a decimal in a range from 0 to 1 with 0 indicating a low amount of prior transactions and 1 indicating a large amount of prior transactions. In some implementations a distribution probability for an individual potential award may be calculated by finding the difference between 1 and a user's spending metric, such that as the spending metric approaches 1, the distribution probability approaches 0.

In some implementations a distribution probability may be based on a conditional test. In some implementations for example, when a spending metric is less than or equal to 0.5, the distribution probability may equal 1, and where the spending metric is greater than 0.5, the distribution probability may equal 0.

In some instances the distribution probability may be expressed as the likelihood that an individual potential award will not be chosen; therefore, in some instances as the distribution probability increases, the individual potential award is less likely to be stochastically chosen. Other instances of assigning one or more distribution probabilities to one or more individual potential awards are envisioned.

An activation component 26 may be configured to stochastically choose none, one or more actual awards from a selection of one or more individual potential awards, wherein one or more of the individual potential awards may be associated with one or more distribution probabilities. In some cases one or more of the actual awards in the probability item bundle may be determined when the user examines the contents of the probability item bundle. In some cases a user may only examine the contents of a probability item bundle after it is purchased. In some cases one or more of the actual awards in the probability item bundle may be determined when the user purchases the probability item bundle. In some implementations the actual awards contained in the probability item bundle may be determined prior to the user purchasing the probability item bundle. In implementations where the actual awards are determined prior to the user purchasing the probability item bundle, the identity of the actual awards may be obfuscated from the view of the user until the user purchases the probability item bundle.

In some implementations a user activating a probability item bundle may be different from a user purchasing the probability item bundle. In some instances the distribution probabilities for individual potential awards are based on the user purchasing the probability item bundle. In some instances the purchaser may send the probability item bundle to another user to activate the stochastic selection process.

In some implementations the server 12 and client computing platforms 30 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12 and client computing platforms 30 may be operatively linked via some other communication media.

A given client computing platform 30 may include one or more processors configured to execute computer program components. The computer program components may be configured to enable an expert or user associated with the given client computing platform 30 to interface with server 12, and/or provide other functionality attributed herein to client computing platforms 30. By way of non-limiting example, the given client computing platform 30 may include one or more of a desktop computer, a laptop computer, a handheld computer, a tablet computing platform, a NetBook, a Smartphone, a gaming console, and/or other computing platforms.

Server 12 may include electronic storage 28, one or more processors 14, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 28 may comprise non-transitory storage media that electronically stores information. The electronic storage media of electronic storage 28 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 14, information received from server 12, information received from client computing platforms 30, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations processor 14 may include a plurality of processing units. These processing units may be physically located within the same device, or processor 14 may represent processing functionality of a plurality of devices operating in coordination. The processor 14 may be configured to execute components 16, 18, 20, 22, 24, and 26. Processor 14 may be configured to execute components 16, 18, 20, 22, 24, and 26 by software; hardware; firmware; some combination of software, hardware, and/or firmware; and/or other mechanisms for configuring processing capabilities on processor 14. As used herein, the term "component" may refer to any component or set of components that perform the functionality attributed to the component. This may include one or more physical processors during execution of processor readable instructions, the processor readable instructions, circuitry, hardware, storage media, or any other components.

Figure 2:
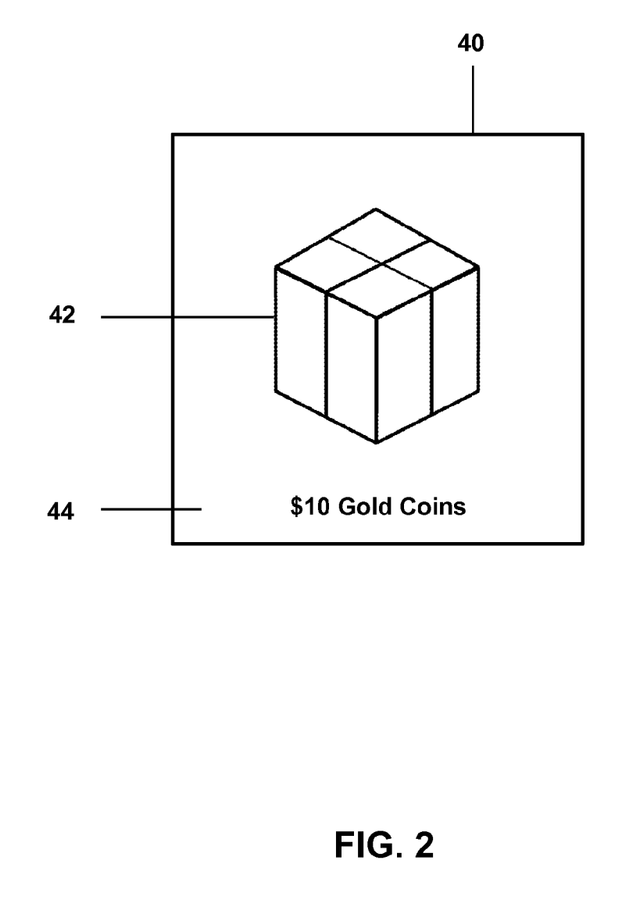
FIG. 2 illustrates an instance of an offer for a probability item bundle.

FIG. 2 illustrates an offer for a probability item bundle. A user of a game space may be presented with a game space interface. The game space interface may be configured to display an offer 40. An offer 40 may display a probability item bundle 42 for sale for an amount of consideration 44.

Figure 3:
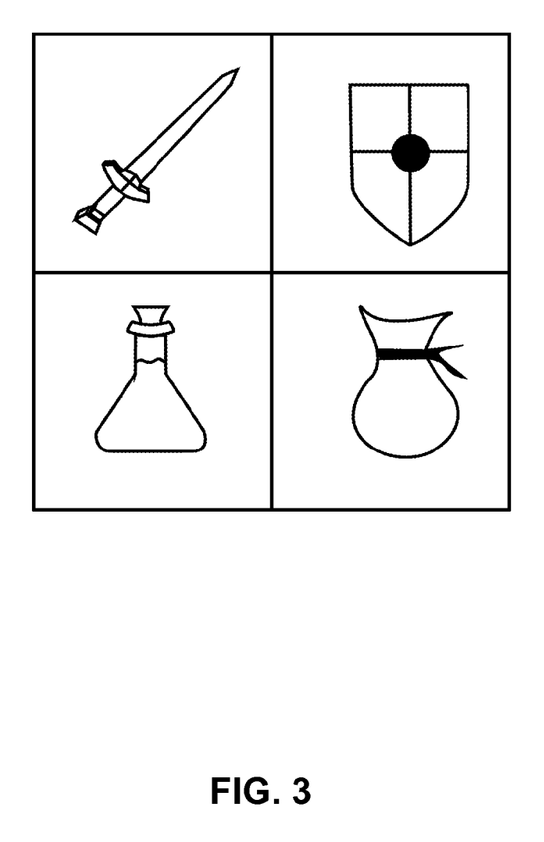
FIG. 3 illustrates actual awards of a probability item bundle determined for a user with an average spending metric.

FIG. 3 illustrates the contents of a first probability item bundle. The contents of a first probability item bundle may be determined based on distribution probabilities for a user with an average spending metric in a game space.

Figure 4:
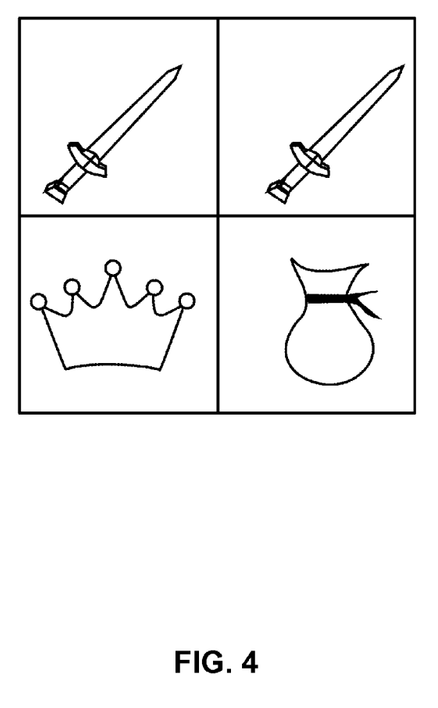
FIG. 4 illustrates actual awards of a probability item bundle determined for a user with a spending metric indicating a below average purchase history.

FIG. 4 illustrates the contents of a second probability item bundle. The contents of a second probability item bundle may be determined based on distribution probabilities for a user with a spending metric that indicates a history of minimal spending when compared to an average user.

Figure 5:
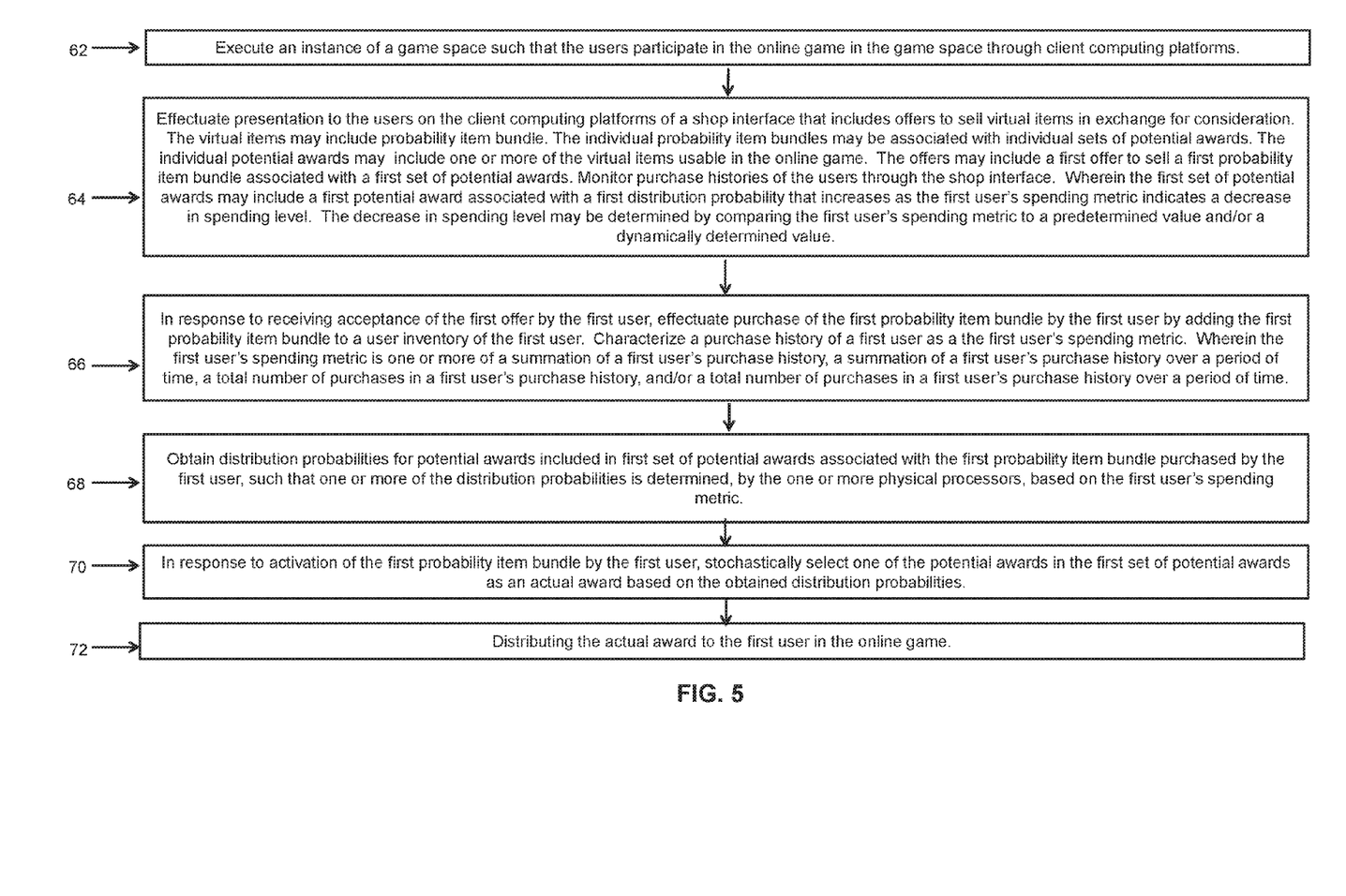
FIG. 5 illustrates a method of providing a game space, in accordance with one or more implementations.

FIG. 5 illustrates a method 60 of generating and accepting an offer for a probability item bundle. The operations of method 60 presented below are intended to be illustrative. In some implementations, the method 60 may be accomplished with one or more additional operations not described, and/or without one or more of the operations discussed. Additionally, the order in which the operations of method 60 are illustrated in FIG. 5 and described below are not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, a spending metric is generated for a user of a game space. Operation 62 may be performed by a purchase history component that is the same as or similar to purchase history component 20, in accordance with one or more implementation.

At an operation 64, an offer for a probability item bundle is presented to a game space user. Operation 64 may be performed by a shop component that is the same as or similar to shop component 18, in accordance with one or more implementation.

At an operation 66, an acceptance of an offer to purchase a probability item bundle is received. Operation 66 may be performed by a shop component that is the same as or similar to shop component 18, in accordance with one or more implementation.

At operation 68, one or more distribution probabilities are generated for one or more individual potential awards associated with the probability item bundle. Operation 68 may be performed by a probability component that is the same as or similar to probability component 24.

At an operation 70, one or more actual awards are chosen from one or more individual potential awards associated with the purchase probability item bundle. Operation 70 may be performed by an activation component that is the same as or similar to activation component 26, in accordance with one or more implementation.

At operation 72, one or more actual awards of the probability item bundle are distributed to the user.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that delivers offers to users of an online game, the system comprising:
one or more physical processors configured by machine-readable instructions to:
execute an instance of a game space such that the users participate in the online game in the game space through client computing platforms, the users include a first user;
effectuate presentation to the users on the client computing platforms of a shop interface that includes offers to sell virtual items in exchange for consideration, the virtual items including probability item bundles, the individual probability item bundles being associated with individual sets of potential awards where the individual potential awards include one or more of the virtual items usable in the online game, the offers including a first offer to sell a first probability item bundle associated with a first set of potential awards;
monitor purchase histories of the users through the shop interface;
in response to receiving acceptance of the first offer by the first user, effectuate purchase of the first probability item bundle by the first user by adding the first probability item bundle to a user inventory of the first user;
characterize a purchase history of a first user as the first user's spending metric;
obtain distribution probabilities for the potential awards included in the first set of potential awards associated with the first probability item bundle purchased by the first user, such that one or more of the distribution probabilities is determined, by the one or more physical processors, based on the first user's spending metric;
in response to activation of the first probability item bundle by the first user, stochastically selecting one of the potential awards in the first set of potential awards as an actual award based on the obtained distribution probabilities; and
distributing the actual award to the first user in the online game.

2. A system of claim 1, wherein the first set of potential awards includes a first potential award associated with a first distribution probability that increases as the first user's spending metric indicates a decrease in spending level.

3. A system of claim 2, wherein the decrease in spending level is determined by comparing, via the one or more physical processors, the first user's spending metric to a predetermined value.

4. A system of claim 2, wherein the decrease in spending level is determined by comparing , via the one or more physical processors, the first user's spending metric to a dynamically determined value.

5. A system of claim 2, wherein the first distribution probability is a function of the first user's spending metric.

6. A system of claim 2, wherein the first user's spending metric is a summation of the first user's purchase history.

7. A system of claim 2, wherein the first user's spending metric is a summation of the first user's purchase history over a period of time.

8. A system of claim 2, wherein the first user's spending metric is a total number of purchases in the first user's purchase history.

9. A system of claim 2, wherein the first user's spending metric is a total number of purchases in the first user's purchase history over a period of time.

10. A computer implemented method of delivering offers to users of an online game, the method being implemented in a computer system that includes one or more physical processors executing machine-readable instructions, the method comprising:
executing an instance of a game space such that the users participate in the online game in the game space through client computing platforms, the users include a first user;
effectuating presentation to the users on the client computing platforms of a shop interface that includes offers to sell virtual items in exchange for consideration, the virtual items including probability item bundles, the individual probability item bundles being associated with individual sets of potential awards where the individual potential awards include one or more of the virtual items usable in the online game, the offers including a first offer to sell a first probability item bundle associated with a first set of potential awards;

monitoring purchase histories of the users through the shop interface;

in response to receiving acceptance of the first offer by the first user, effectuating purchase of the first probability item bundle by the first user by adding the first probability item bundle to a user inventory of the first user;

characterizing a purchase history of a first user as the first user's spending metric;

obtaining distribution probabilities for the potential awards included in the first set of potential awards associated with the first probability item bundle purchased by the first user, one or more of the distribution probabilities being determined based on the first user's spending metric;

in response to activation of the first probability item bundle by the first user, stochastically selecting one of the potential awards in the first set of potential awards as an actual award based on the obtained distribution probabilities; and distributing the actual award to the first user in the online game.

11. A method of claim 10, wherein the first set of potential awards includes a first potential award associated with a first distribution probability that increases as the first user's spending metric indicates a decrease in spending level.

12. A method of claim 11, wherein the decrease in spending level is determined by comparing the first user's spending metric to a predetermined value.

13. A method of claim 11, wherein the decrease in spending level is determined by comparing the first user's spending metric to a dynamically determined value.

14. A method of claim 11, wherein the first distribution probability is a function of the first user's spending metric.

15. A method of claim 11, wherein the first user's spending metric is a summation of the first user's purchase history.

16. A method of claim 11, wherein the first user's spending metric is a summation of the first user's purchase history over a period of time.

17. A method of claim 11, wherein the first user's spending metric is a total number of purchases in the first user's purchase history.

18. A method of claim 11, wherein the first user's spending metric is a total number of purchases in the first user's purchase history over a period of time.

* * * * *